(12) United States Patent
Yeh

(10) Patent No.: US 9,569,043 B2
(45) Date of Patent: Feb. 14, 2017

(54) METHOD AND DEVICE FOR REDUCING POOR LINEARITY IN LOCATION DETECTION

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 378 days.

(21) Appl. No.: 14/140,826

(22) Filed: Dec. 26, 2013

(65) Prior Publication Data

US 2014/0184564 A1    Jul. 3, 2014

(30) Foreign Application Priority Data

Dec. 28, 2012 (TW) .............................. 101150822 A

(51) Int. Cl.
*G06F 3/044* (2006.01)

(52) U.S. Cl.
CPC ..................................... *G06F 3/044* (2013.01)

(58) Field of Classification Search
CPC ...................................................... G06F 3/044
See application file for complete search history.

(56) References Cited

U.S. PATENT DOCUMENTS

| | | | | |
|---|---|---|---|---|
| 8,477,106 B2* | 7/2013 | Salaverry | ................ | G06F 3/044 345/173 |
| 8,674,956 B2* | 3/2014 | Sumi | ....................... | G06F 3/044 178/18.01 |
| 9,007,322 B1* | 4/2015 | Young | .................... | G06F 3/0418 178/18.03 |
| 9,024,886 B2* | 5/2015 | Doi | ........................ | G06F 3/0418 345/173 |
| 2005/0156881 A1* | 7/2005 | Trent | ................... | G06F 3/03547 345/157 |
| 2006/0032680 A1* | 2/2006 | Elias | ....................... | G06F 3/044 178/18.06 |
| 2008/0106520 A1* | 5/2008 | Free | ..................... | G06F 3/03545 345/173 |
| 2008/0150906 A1* | 6/2008 | Grivna | .................. | G06F 3/0416 345/173 |
| 2010/0097328 A1* | 4/2010 | Simmons | .............. | G06F 3/0416 345/173 |
| 2010/0097329 A1* | 4/2010 | Simmons | .............. | G06F 3/0416 345/173 |
| 2010/0265211 A1* | 10/2010 | Oishi | ...................... | G06F 3/044 345/174 |

(Continued)

FOREIGN PATENT DOCUMENTS

| | | | | |
|---|---|---|---|---|
| JP | WO 2012111042 A1 * | 8/2012 | .......... | G06F 3/0418 |
| TW | 201122974 | 7/2011 | | |
| TW | 201250565 | 8/2011 | | |

*Primary Examiner* — Adam R Giesy
*Assistant Examiner* — Karin Kiyabu
(74) *Attorney, Agent, or Firm* — WPAT, PC; Justin King; Jonathan Chiang

(57) ABSTRACT

The changes of capacitances of a plurality of detecting locations on a touch screen are detected for determining a profile corresponding to each external object approaching or touching the touch screen. Then the location of each external object is generated separately by two or four values in the corresponding profile.

9 Claims, 6 Drawing Sheets

(56) References Cited

U.S. PATENT DOCUMENTS

| | | | |
|---|---|---|---|
| 2011/0127092 A1* | 6/2011 | Lu | G06F 3/0416 178/18.06 |
| 2011/0157074 A1* | 6/2011 | Lin | G06F 3/044 345/174 |
| 2012/0319994 A1* | 12/2012 | Hatano | G06F 3/044 345/174 |
| 2013/0321318 A1* | 12/2013 | Okano | G06F 3/044 345/173 |
| 2015/0169123 A1* | 6/2015 | Lee | G06F 3/044 345/174 |

* cited by examiner detecting changes in capacitances of a plurality of detecting locations on the touch screen, wherein each change in capacitances corresponds to a coordinate
310

↓ determining a profile corresponding to each external object based on the changes in capacitances of the detecting locations on the touch screen, and generating a coordinate data of each external object based on two values in the corresponding profile
320

FIG. 3

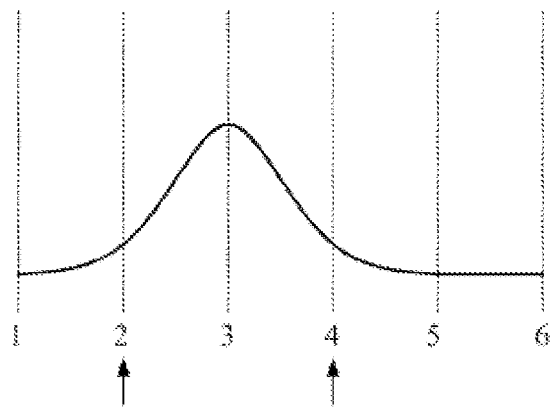

FIG. 4 detecting changes in capacitances of a plurality of detecting locations on the touch screen, wherein each change in capacitances corresponds to a coordinate
510 determining a profile corresponding to each external object based on the changes in capacitances of the detecting locations on the touch screen, and generating a coordinate data of each external object based on four values in the corresponding profile
520

FIG. 5

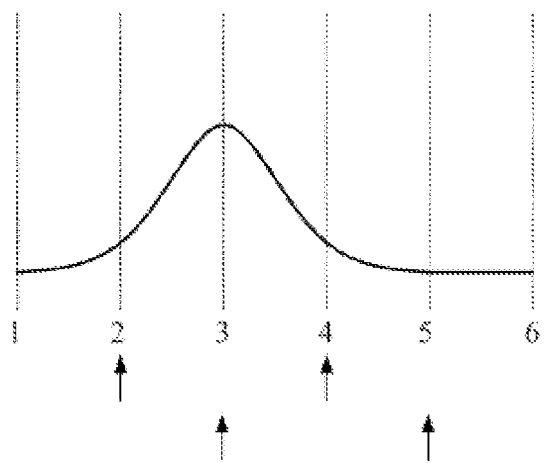

FIG. 6 calculating a first centroid coordinate based on a value immediately preceding the largest value and a value immediately following the largest value in the profile of each external object, and setting the first centroid coordinate as the coordinate corresponding to the largest value
710 calculating a second centroid coordinate based on a value immediately preceding the second largest value and a value immediately following the second largest value in the profile of each external object, and setting the second centroid coordinate as the coordinate corresponding to the second largest value
720 calculating the coordinate data based on the largest value and the second largest value in the profile of each external object, wherein the coordinate data is calculated based on the first and the second centroid coordinates
730

FIG. 7

METHOD AND DEVICE FOR REDUCING POOR LINEARITY IN LOCATION DETECTION

CROSS REFERENCE TO RELATED APPLICATIONS

This application claims priority under 35 U.S.C. 119 to Taiwan patent application, 101150822, filed on Dec. 28, 2012, the disclosure of which is incorporated herein by reference.

BACKGROUND OF THE INVENTION

1. Field of the Invention

The present invention relates to a method and device for location detection, and more particularly, to a method and device for location detection with higher linearity.

2. Description of the Prior Art

A traditional capacitive touch screen typically includes an insulating surface layer, a first conductive layer, a dielectric layer, and a second conductive layer, wherein the first and second conductive layers have a plurality of first conductive strips and second conductive strips, respectively, and these conducting strips are made up by a plurality of conductive pads and connection wires connecting these conductive pads in series.

The changes in capacitances of a plurality of detecting locations on the touch screen can be obtained. These detecting locations correspond to the first conducting strips or the second conducting strips. When an external object approaches or touches the touch screen, a profile corresponding to the external object will appear in the changes in capacitances as shown in FIG. 1A, for example. A coordinate data (a location) corresponding to the external object can then be calculated based on some or all of the values in the corresponding profile. For example, a centroid location is calculated based on the largest three values or all of the values.

In a profile, the largest value will have the biggest influence on the coordinate location. For example, in FIG. 1A, the coordinate data is calculated from the largest value and values at either side (the preceding and the following values). Since the peak (it may be referred as relative high point hereinafter) of this profile is at the third value, the coordinate data will be close to the coordinates of the third value.

However, during the movement of an external object, the peak will shift from one value to other neighboring values, for example, as shown in FIGS. 1B and 1C. As the largest value influences the coordinate value the most, with respect to the actual location of the moving external object, the coordinate data will result in the detected movement to be slowing down then speeding up and then slowing down again. As a result, poor linearity shown in FIG. 1D will occur.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

An objective of the present invention is to reduce the influence of the largest value during the generation of a coordinate data to reduce the issue of poor linearity.

The above and other objectives of the present invention can be achieved by the following technical scheme. A method for location detection of a touch screen proposed by the present invention may include: detecting changes in capacitances of a plurality of detecting locations on the touch screen, wherein each change in capacitances corresponds to a coordinate; and determining a profile corresponding to each external object based on the changes in capacitances of the detecting locations on the touch screen, and generating a coordinate data of each external object based on four values in the corresponding profile.

The above and other objectives of the present invention can also be achieved by the following technical scheme. A method for location detection of a touch screen proposed by the present invention may include: detecting changes in capacitances of a plurality of detecting locations on the touch screen, wherein each change in capacitances corresponds to a coordinate; and determining a profile corresponding to each external object based on the changes in capacitances of the detecting locations on the touch screen, and generating a coordinate data of each external object based on two values in the corresponding profile.

The above and other objectives of the present invention can also be achieved by the following technical scheme. A device for location detection of a touch screen proposed by the present invention may include: a detecting unit for detecting changes in capacitances of a plurality of detecting locations on the touch screen, wherein each change in capacitances corresponds to a coordinate; and a control unit for determining a profile corresponding to each external object based on the changes in capacitances of the detecting locations on the touch screen, and generating a coordinate data of each external object is based on four values in the corresponding profile.

The above and other objectives of the present invention can further be achieved by the following technical scheme. A device for location detection of a touch screen proposed by the present invention may include: a detecting unit for detecting changes in capacitances of a plurality of detecting locations on the touch screen, wherein each change in capacitances corresponds to a coordinate; and a control unit for determining a profile corresponding to each external object based on the changes in capacitances of the detecting locations on the touch screen, and generating a coordinate data of each external object is based on two values in the corresponding profile.

With the above technical scheme, the present invention includes at least the following advantages and beneficial effects: the influence of the largest value during the generation of a coordinate data can be reduced, thereby reducing the issue of poor linearity.

BRIEF DESCRIPTION OF THE DRAWINGS

FIG. 3 is a flowchart illustrating a first embodiment of the present invention;

FIG. 4 is an example of the first embodiment of the present invention;

FIG. 5 is a flowchart illustrating a second embodiment of the present invention;

FIG. 6 is an example of the second embodiment of the present invention; and

FIG. 7 is a flowchart illustrating the steps for generating a coordinate data in accordance with the present invention.

DETAILED DESCRIPTION OF THE PREFERRED EMBODIMENTS

Figure 1A:
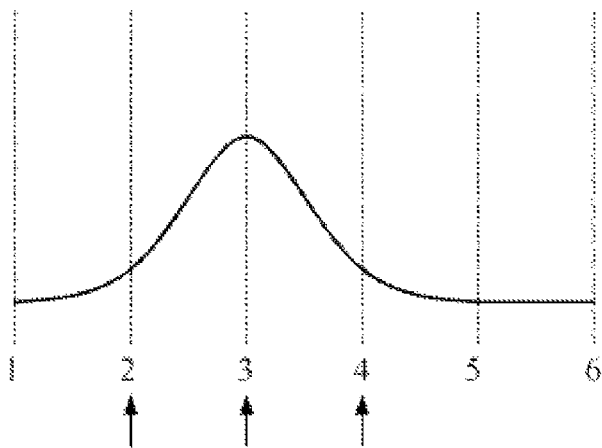
FIGS. 1A to 1D are schematic diagrams illustrating the calculation of a coordinate data in the prior art.
Figure 1B:
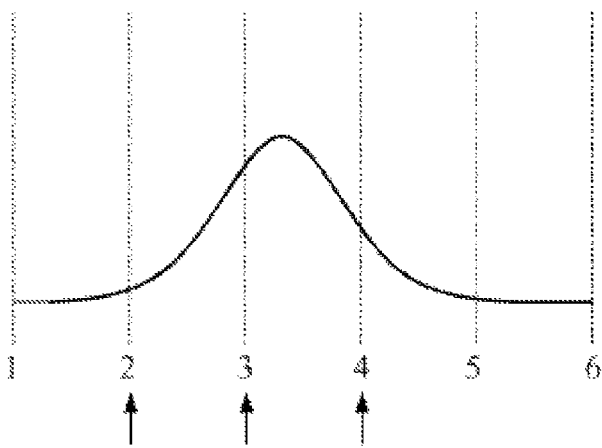
Figure 1C:
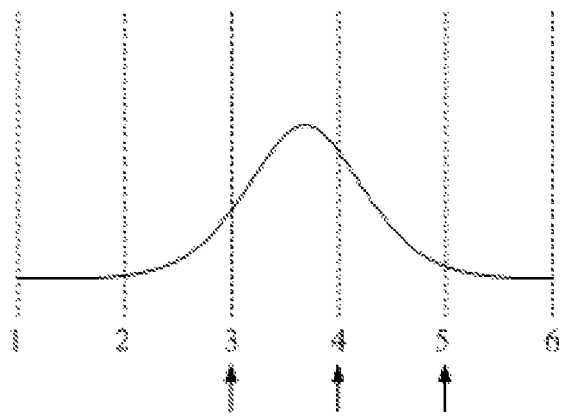
Figure 1D:
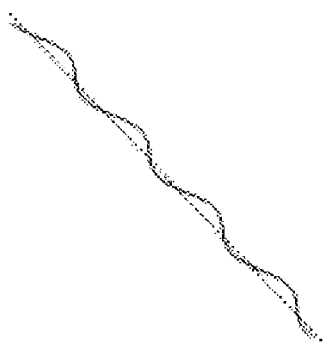

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 2A:
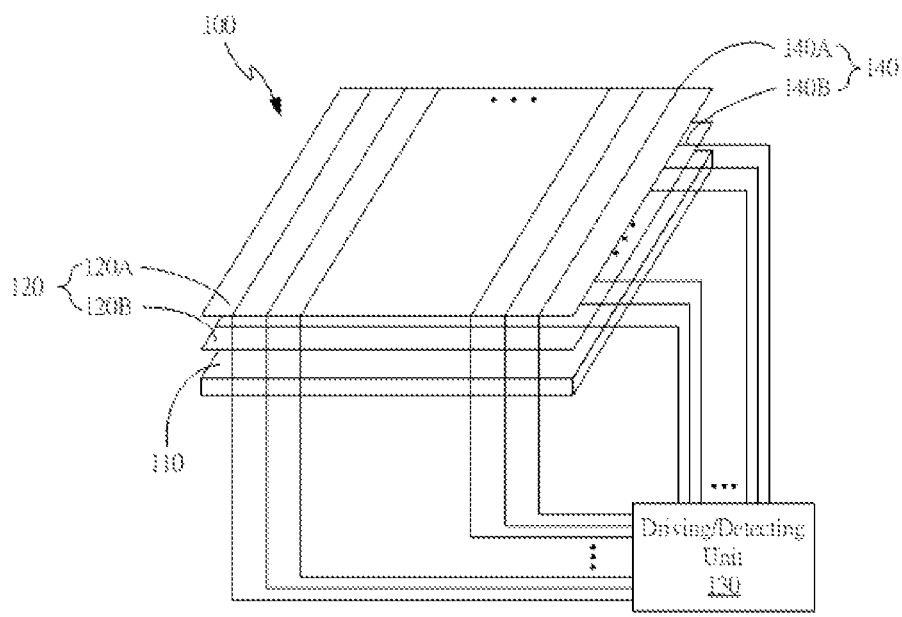
FIGS. 2A and 2B are schematic diagrams illustrating a capacitive sensor.

Referring to FIG. 2A, a location detecting device 100 applicable to the present invention is shown, which includes a touch screen 120 and a driving/detecting unit 130. The touch screen 120 has a sensing layer. In an example of the present invention, the sensing layer can include a first sensing layer 120A and a second sensing layer 120B. The first and second sensing layers 120A and 120B each has a plurality of conductive strips 140, wherein the first conductive strips 140A of the first sensing layer 120A and the second conductive strips 140B of the second sensing layer 120B overlap one another other. In another example of the present invention, the first and second conductive strips 140A and 140B are disposed on a co-planar sensing layer. The driving/detecting unit 130 produces sensing information based on signals of the conductive strips 140. In the case of self-capacitive detection, for example, conductive strips 140 that are being driven are detected. In the case of mutual-capacitive detection, some of the conductive strips 140 that are not being directly driven by the driving/detecting unit 130 are detected. In addition, the touch screen 120 can be disposed on a display 110. An optional shielding layer (not shown) can be interposed between the touch screen 120 and the display 110. In a preferred example of the present invention, there is no rear shielding layer between the touch screen 120 and the display 110 so as to reduce the thickness of the touch screen 120.

The first and second conductive strips can be a plurality of column conductive strips and row conductive strips arranged in columns and rows; a plurality of first dimensional conductive strips and second dimensional conductive strips arranged in first and second dimensions; or a plurality of first axial conductive strips and second axial conductive strips arranged in first and second axes. In addition, the first and second conductive strips can be arranged in orthogonal or non-orthogonal directions. For example, in a polar coordinate system, one of the first and second conductive strips can be arranged in a radial direction, and the other one of the first and second conductive strips can be arranged in a circular direction. Furthermore, one of the first and second conductive strips can be driven conductive strips, while the other one of the first and second conductive strips can be detected conductive strips. The "first dimension" and "second dimension", "first axis" and "second axis", "driving" and "detecting", "driven" or "detected" conductive strips can be used to mean the "first and "second" conductive strips, including but not limited to, being arranged in orthogonal grids, and in any other geometric configurations consisting of first dimensional and second dimensional intersecting conductive strips.

Figure 2B:
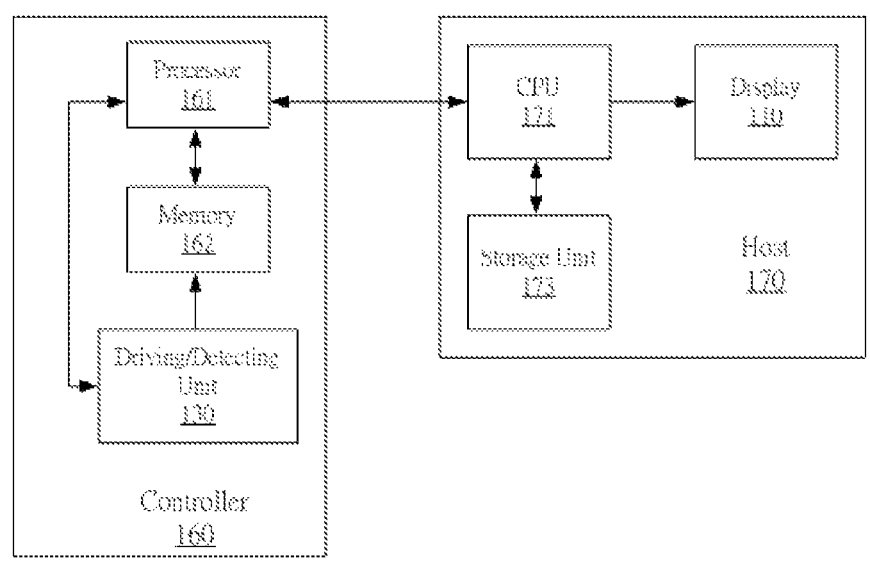

The location detecting device 100 of the present invention can be applicable to a computing system as shown in FIG. 2B, which includes a controller 160 and a host 170. The controller includes the driving/detecting unit 130 to operatively couple the touch screen 120 (not shown). In addition, the controller 160 can include a processor 161 for controlling the driving/detecting unit 130 to generate the sensing information. The sensing information can be stored in a memory 162 accessible by the processor 161. Moreover, the host 170 constitutes the main body of the computing system, and mainly includes a central processing unit 171, a storage unit 173 that can be accessed by the central processing unit 171, and the display 110 for displaying results of operations.

In another example of the present invention, there is a transmission interface between the controller 160 and the host 170. The controlling unit transmits data to the host via the transmission interface. One with ordinary skill in the art can appreciate that the transmission interface may include, but not limited to, UART, USB, I2C, Bluetooth, Wi-Fi, IR and other wireless or wired transmission interfaces. In an example of the present invention, data transmitted can be locations (e.g. coordinates), identified results (e.g. gesture codes), commands, sensing information or other information provided by the controller 160.

In an example of the present invention, the sensing information can be initial sensing information generated under the control of the processor 161, and this information is passed onto the host 170 for location analysis, such as location analysis, gesture determination, command identification, and so on. In another example of the present invention, the sensing information can be analyzed by the processor 161 first before forwarding the determined locations, gestures, commands, or the like to the host 170. The present invention does not limit to this example, and one with ordinary skill in the art can readily recognize other interactions between the controller 160 and the host 170.

At each intersection of the conductive strips, the upper and lower conductive strips form the positive and negative electrodes. Each intersection can be regarded as one pixel in an image. When one or more external objects approach or touch the sensing device, the image can be regarded as a photographed touch image (e.g. the pattern of a finger upon touching the sensing device).

When a driven conductive strip is being provided with a driving signal, the driven conductive strip itself produces self capacitance, and produces mutual capacitance on each intersection of the driven conductive strip. The self-capacitive detection is detecting the self-capacitance of all the conductive strips, which is particularly useful in determining the proximity or touch of a single external object.

In the mutual-capacitive detection, when a driven conductive strip is being provided with a driving signal, capacitances or changes in capacitances of all intersections on the driven conductive strip with all sensed conductive strips arranged in different dimensions to the driven conductive strip are detected, and are regarded as a row of pixels. Accordingly, all the rows of pixels are combined to form the image. When one or more external objects approach or touch the sensing device, the image can be regarded as a photographed touch image, which is particularly useful in determining the proximities or touches of a plurality of external objects.

These conductive strips (the first and second conductive strips) can be made of transparent or opaque materials, such as transparent Indium Tin Oxide (ITO). In terms of the structure, it can be categorized into a Single ITO (SITO) structure and a Double ITO (DITO) structure. One with ordinary skill in the art can appreciate that other materials can be used as the conductive strips, such as carbon nanotube, and they will not be further described.

In an example of the present invention, the horizontal direction is regarded as the first direction, while the vertical direction is regarded as the second direction. Thus, the horizontal conductive strips are the first conductive strips, and the vertical conductive strips are the second conductive strips. However, one with ordinary skill in the art can appreciate that the above is merely an example of the present invention, and the present invention is not limited to this. For example, the vertical direction can be regarded as the first direction, while the horizontal direction can be regarded as the second direction.

During two-dimensional (2D) mutual capacitive detection, alternating driving signals are sequentially provided to each first conductive strip, and one-dimensional (1D) sensing information corresponding to each driven first conductive strip is obtained from the signals of the second conductive strips. Sensing information of all the first conductive strips are combined together to form 2D sensing information. 1D sensing information can be generated based on the signal of a second conductive strip, or based on the difference between the signal of a conductive strip and a reference value. In addition, the sensing information can be generated based on current, voltage, level of capacitive coupling, amount of charge or other electrical characteristics, and can be in analog or digital form.

When there is no external object actually approaching or covering the touch screen, or when the system has not determined any external object actually approaching or covering the touch screen, the location detecting device may generate reference values based on the signals of the second conductive strips. These reference values represent any stray capacitance on the touch screen. Sensing information can be generated based on the signals of the second conductive strips or the signals of the second conductive strips after being subtracted by the respective reference values.

Referring to FIG. 3, a method for location detection of a touch screen in accordance with a first embodiment the present invention is shown. In step 310, changes in capacitances of a plurality of detecting locations on a touch screen are detected, wherein each change in capacitances corresponds to a coordinate. Then, in step 320, a profile corresponding to each external object is determined based on the changes in capacitances of the detecting locations on the touch screen, and then a coordinate data of each external object is generated based on two values in the corresponding profile.

The two values in the profile of each external object may be two values including the largest value, or two values not including the largest value. In addition, the two values in the profile of each external object may or may not be adjacent to each other.

In an example of the present invention, a coordinate data is (C1×X1+C3×X3)/(C1+C3), wherein X1 and X3 are the coordinates for C1 and C3, respectively, and C1 and C3 correspond to two values in a profile of an external object, respectively.

Referring to FIG. 4, a schematic diagram illustrating an example proposed by the first embodiment of the present invention. In this example, a coordinate data is generated based on two non-adjacent values not including the largest value, for example, a value (second value) preceding the largest value (third value) and a value (fourth value) following the largest value (third value).

Accordingly, the present invention provides a device for location detection of a touch screen, which includes a detecting unit and a control unit. The detecting unit may be the driving/detecting unit shown in FIG. 2A for detecting changes in capacitances of a plurality of detecting locations on the touch screen, wherein each change in capacitances corresponds to a coordinate. The control unit may be the controller 160 shown in FIG. 2B for determining a profile corresponding to each external object based on the changes in capacitances of the detecting locations on the touch screen, and generating a coordinate data of each external object based on two values in the corresponding profile.

Referring to FIG. 5, a method for location detection of a touch screen is proposed by a second embodiment of the present invention. As shown in step 510, changes in capacitances of a plurality of detecting locations on a touch screen are detected, wherein each change in capacitances corresponds to a coordinate. Then, in step 520, a profile corresponding to each external object is determined based on the changes in capacitances of the detecting locations on the touch screen, and then a coordinate data of each external object is generated based on four values in the corresponding profile.

In an example of the present invention, the coordinate data is calculated as follows:

$$\frac{\frac{(C1 \times X1 + C3 \times X3)}{C1 + C3} \times C2 + \frac{(C2 \times X2 + C4 \times X4)}{C2 + C4} \times C3}{C2 + C3},$$

wherein X1, X2, X3 and X4 are the coordinates for C1, C2, C3 and C4, respectively, and C1, C2, C3 and C4 correspond to four values in a profile of an external object, respectively.

Referring to FIG. 6, a schematic diagram illustrating an example proposed by the second embodiment of the present invention. In this example, a coordinate data is generated based on a value (second value) immediately preceding the largest value (third value) and a value (fourth value) immediately following the largest value (third value), and a value (third value) immediately preceding a value (fourth value) adjacent to the largest value (third value) and a following value (fourth value).

In an example of the present invention, the largest value and the second largest value are adjacent to each other. The coordinate data is generated based on a value (second value) immediately preceding the largest value (third value) and a value (fourth value) immediately following the largest value (third value), and a value (third value) immediately preceding the second largest value (fourth value) and a value (fifth value) immediately following the second largest value (fourth value). For example, aforementioned C1 and C3 are the values immediately preceding and following the largest value, respectively, and aforementioned C2 and C4 are the values immediately preceding and following the second largest value, respectively. As another example, aforementioned C2 and C4 are the values immediately preceding and following the largest value, respectively, and aforementioned C1 and C3 are the values immediately preceding and following the second largest value, respectively.

Accordingly, the present invention provides a device for location detection of a touch screen, which includes a detecting unit and a control unit. The detecting unit may be the driving/detecting unit shown in FIG. 2A for detecting changes in capacitances of a plurality of detecting locations on the touch screen, wherein each change in capacitances corresponds to a coordinate. The control unit may be the controller 160 shown in FIG. 2B for determining a profile corresponding to each external object based on the changes in capacitances of the detecting locations on the touch screen, and generating a coordinate data of each external object based on four values in the corresponding profile.

In an example of the present invention, a centroid coordinate is calculated based on the value immediately preceding the largest value and the value immediately following the largest value, and resetting the centroid coordinate as the coordinate corresponding to the largest value. Moreover, a centroid coordinate is calculated based on the value immediately preceding the second largest value and the value immediately following the largest value, and resetting this centroid coordinate as the coordinate corresponding to the second largest value. Then, a centroid location is calculated based on the largest value and the second largest value.

Referring to FIG. 7, a flowchart illustrating the steps for generating a coordinate data in accordance with the present invention is shown. First, in step 710, a first centroid coordinate is calculated based on a value immediately preceding the largest value and a value immediately following the largest value in the profile of each external object, and the first centroid coordinate is set as the coordinate corresponding to the largest value. Then, in step 720, a second centroid coordinate is calculated based on a value immediately preceding the largest value and a value immediately following the second largest value in the profile of each external object, and the second centroid coordinate is set as the coordinate corresponding to the second largest value. Next, in step 730, a coordinate data is calculated based on the largest value and the second largest value in the profile of each external object, wherein the coordinate data is calculated based on the first and the second centroid coordinates.

For example, when the largest value precedes the second largest value, the first centroid coordinate will be (C1×X1+C3×X3)/(C1+C3), and the second centroid coordinate will be (C2×X2+C4×X4)/(C2+C4), wherein X1, X2, X3 and X4 are the coordinates for C1, C2, C3 and C4, respectively, and C1, C2 and C3 correspond to the value immediately preceding the largest value, the largest value, and the value immediately following the largest value in a profile of an external object, respectively, and C2, C3 and C4 correspond to the value immediately preceding the second largest value, the second largest value, and the value immediately following the second largest value in a profile of an external object, respectively.

As another example, when the largest value follows the second largest value, the first centroid coordinate will be (C2×X2+C4×X4)/(C2+C4), and the second centroid coordinate will be (C1×X1+C3×X3)/(C1+C3), wherein X1, X2, X3 and X4 are the coordinates for C1, C2, C3 and C4, respectively, and C1, C2 and C3 correspond to the value immediately preceding the largest value, the largest value, and the value immediately following the largest value in a profile of an external object, respectively, and C2, C3 and C4 correspond to the value immediately preceding the second largest value, the second largest value, and the value immediately following the second largest value in a profile of an external object, respectively.

Accordingly, the coordinate value is (((C1×X1+C3×X3)/(C1+C3))×C2+((C2×X2+C4×X4)/(C2+C4))×C3)/(C2+C3).

In the descriptions above, coordinates X1, X2, X3 and X4 can be 1D coordinate or 2D coordinate. For example, a 1D vertical coordinate x, a 1D horizontal coordinate y, or a 2D vertical and horizontal coordinate (x, y). Thus, when generating the coordinate data described before, a vertical coordinate and a horizontal coordinate may be generated separately to form the coordinate data.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. The method for location detection of a touch screen comprising:
   detecting changes in capacitances of a plurality of detecting locations on the touch screen, wherein each change in capacitances corresponds to a coordinate; and
   determining a profile corresponding to each external object based on the changes in capacitances of the detecting locations on the touch screen, and generating a coordinate data of each external object based on four values in the corresponding profile;
   wherein, the coordinate data is as follows:

$$\frac{\frac{(C1 \times X1 + C3 \times X3)}{C1 + C3} \times C2 + \frac{(C2 \times X2 + C4 \times X4)}{C2 + C4} \times C3}{C2 + C3},$$

wherein X1, X2, X3 and X4 are the coordinates for C1, C2, C3 and C4, respectively, and C1, C2, C3 and C4 correspond to the four values in the corresponding profile of each external object, respectively.

2. The method for location detection of claim 1, wherein C1 and C3 are values immediately preceding and following the largest value, respectively, and C2 and C4 are values immediately preceding and following the second largest value, respectively.

3. The method for location detection of claim 1, wherein C2 and C4 are values immediately preceding and following the largest value, respectively, and C1 and C3 are values immediately preceding and following the second largest value, respectively.

4. The method for location detection of claim 1, wherein generating the coordinate data includes:
   calculating a first centroid coordinate based on a value immediately preceding the largest value and a value immediately following the largest value in the profile of each external object, and setting the first centroid coordinate as the coordinate corresponding to the largest value;
   calculating a second centroid coordinate based on a value immediately preceding the second value and a value immediately following the second largest value in the profile of each external object, and setting the second centroid coordinate as the coordinate corresponding to the second largest value; and
   calculating the coordinate data based on the largest value and the second largest value in the profile of each external object, wherein the coordinate data is calculated based on the first and the second centroid coordinates.

5. The method for location detection of claim 4, wherein the first centroid coordinate is (C1×X1+C3×X3)/(C1+C3), and the second centroid coordinate is (C2×X2+C4×X4)/(C2+C4), wherein X1, X2, X3 and X4 are the coordinates for C1, C2, C3 and C4, respectively, and C1, C2 and C3 correspond to the value immediately preceding the largest value, the largest value, and the value immediately following the largest value in the profile of each external object, respectively, and C2, C3 and C4 correspond to the value immediately preceding the second largest value, the second largest value, and the value immediately following the second largest value in the profile of each external object, respectively.

6. The method for location detection of claim 4, wherein the first centroid coordinate is (C2×X2+C4×X4)/(C2+C4), and the second centroid coordinate is (C1×X1+C3×X3)/(C1+C3), wherein X1, X2, X3 and X4 are the coordinates for C1, C2, C3 and C4, respectively, and C1, C2 and C3 correspond to the value immediately preceding the largest value, the largest value, and the value immediately following the largest value in the profile of each external object, respectively, and C2, C3 and C4 correspond to the value immediately preceding the second largest value, the second largest value, and the value immediately following the second largest value in the profile of each external object, respectively.

7. A device for location detection of a touch screen comprising:
   a detecting unit for detecting changes in capacitances of a plurality of detecting locations on the touch screen, wherein each change in capacitances corresponds to a coordinate; and
   a control unit for determining a profile corresponding to each external object based on the changes in capacitances of the detecting locations on the touch screen, and generating a coordinate data of each external object is based on four values in the corresponding profile; wherein, the coordinate data is as follows:

$$\frac{\frac{(C1 \times X1 + C3 \times X3)}{C1 + C3} \times C2 + \frac{(C2 \times X2 + C4 \times X4)}{C2 + C4} \times C3}{C2 + C3},$$

wherein X1, X2, X3 and X4 are the coordinates for C1, C2, C3 and C4, respectively, and C1, C2, C3 and C4 correspond to the four values in the corresponding profile of each external object, respectively.

8. The device for location detection of claim 7, wherein C1 and C3 are values immediately preceding and following the largest value, respectively, and C2 and C4 are values immediately preceding and following the second largest value, respectively.

9. The device for location detection of claim 7, wherein C2 and C4 are values immediately preceding and following the largest value, respectively, and C1 and C3 are values immediately preceding and following the second largest value, respectively.

* * * * *